(12) United States Patent
Itakura et al.

(10) Patent No.: US 12,545,432 B2
(45) Date of Patent: Feb. 10, 2026

(54) METHOD FOR CONNECTING TETHER

(71) Applicant: TOYOTA JIDOSHA KABUSHIKI KAISHA, Toyota (JP)

(72) Inventors: Eiji Itakura, Gotemba (JP); Yushi Seki, Ashigarakami-gun (JP); Taro Tsukada, Sunto-gun (JP); Akihiro Honda, Gotemba (JP); Aya Hamajima, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/007,010

(22) Filed: Dec. 31, 2024

(65) Prior Publication Data

US 2025/0282491 A1    Sep. 11, 2025

(30) Foreign Application Priority Data

Mar. 8, 2024   (JP) .................................. 2024-035896

(51) Int. Cl.
*B64F 1/02*   (2006.01)

(52) U.S. Cl.
CPC .................................. *B64F 1/029* (2020.01)

(58) Field of Classification Search
CPC ....................................................... B64F 1/029
See application file for complete search history.

(56) References Cited

U.S. PATENT DOCUMENTS

| | | | |
|---|---|---|---|
| 7,775,483 B2 * | 8/2010 | Olson | G01W 1/08 244/33 |
| 2010/0013236 A1 * | 1/2010 | Carroll | H02G 11/02 290/55 |
| 2017/0363069 A1 * | 12/2017 | Hart | B64C 39/022 |
| 2018/0106236 A1 | 4/2018 | Lee | |

FOREIGN PATENT DOCUMENTS

JP    2018-508712 A    3/2018

* cited by examiner

*Primary Examiner* — Justin M Benedik
(74) *Attorney, Agent, or Firm* — Oliff PLC

(57) ABSTRACT

The present disclosure relates to a method for connecting a tether for anchoring a kite. The method for connecting a tether includes, while the kite is flying, separably connecting another tether different from one tether to the other end of the one tether whose one end is connected to the kite.

5 Claims, 4 Drawing Sheets

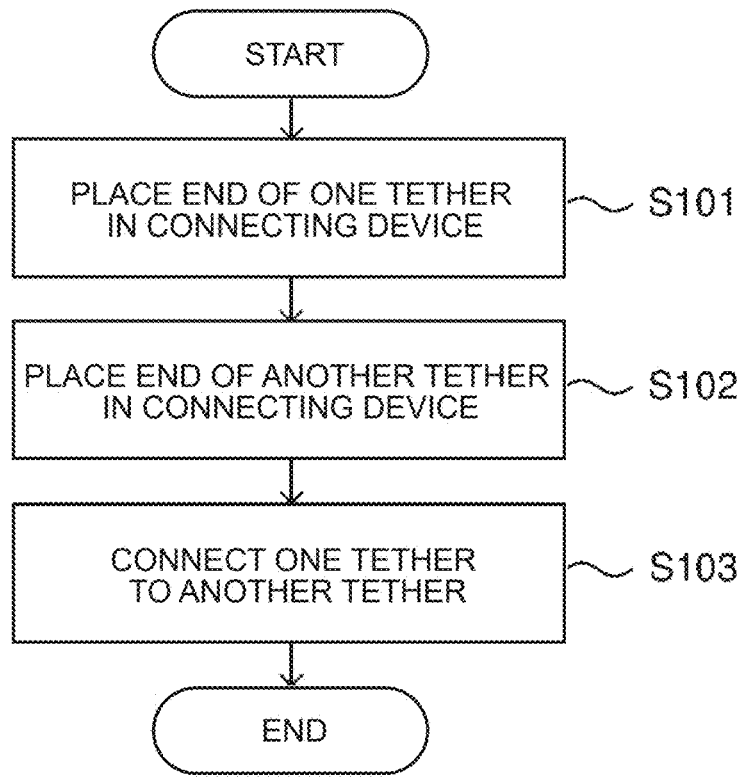
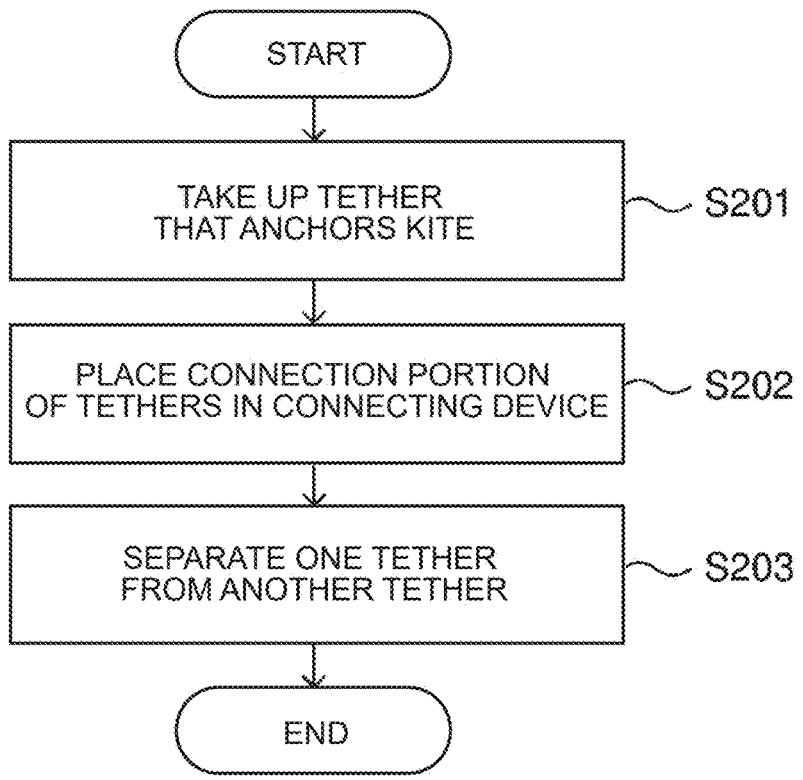

METHOD FOR CONNECTING TETHER

CROSS-REFERENCE TO RELATED APPLICATION

This application claims priority to Japanese Patent Application No. 2024-035896 filed on Mar. 8, 2024, incorporated herein by reference in its entirety.

BACKGROUND

1. Technical Field

The present disclosure relates to the technical field of methods for connecting a tether for anchoring a kite.

2. Description of Related Art

For example, connecting one fixing rope whose one end is connected to a submersible power generation platform and another fixing rope whose one end is connected to a waterway has been proposed as this type of method (see Japanese Unexamined Patent Application Publication (Translation of PCT Application) No. 2018-508712 (JP 2018-508712 A)).

SUMMARY

Part of a tether for anchoring a kite is often wound around, for example, a drum installed on the ground. The higher a target flight altitude of the kite, the longer the tether that anchors the kite, and therefore the larger the drum around which the tether is wound. As the drum becomes larger, a winch also becomes larger. A large winch is technically disadvantageous in its reduced response.

The present disclosure was made in view of, for example, the above issue, and it is an object of the present disclosure to provide a method for connecting a tether that can reduce a decrease in response of a winch.

A method for connecting a tether according to an aspect of the present disclosure includes
while a kite is flying, separably connecting another tether different from one tether to another end of the one tether whose one end is connected to the kite.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating an example of a method of connecting tethers;

FIG. 4 is a flowchart illustrating an example of a process of separating tethers.

DETAILED DESCRIPTION OF EMBODIMENTS

An embodiment of a method for connecting tethers will be described with reference to FIGS. 1 to 5.

Figure 1:
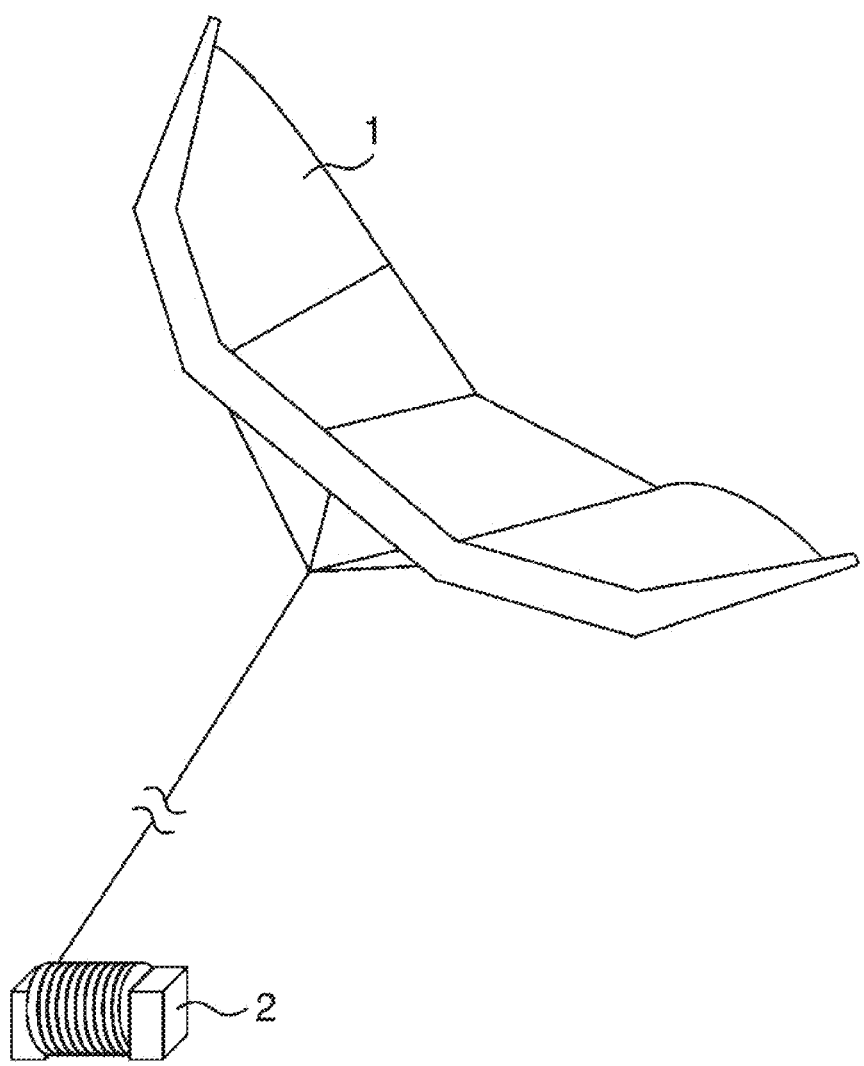
FIG. 1 is a diagram illustrating an example of a wind power generation system.

First, an outline of a tethered wind power generation system using a kite will be described with reference to FIG. 1. In FIG. 1, the wind power generation system includes a kite 1 and a ground equipment 2. The ground equipment 2 may comprise a winch having a drum wrapped with tethers for anchoring the kite 1. The ground equipment 2 may further comprise a generator connected to the axis of rotation of the drum. The ground equipment 2 moors the kite 1, and may be referred to as a mooring device. Note that the shape of the kite 1 shown in FIG. 1 is an example, and is not limited to this. In FIG. 1, although there is only one tether for mooring the kite 1, the kite 1 may be moored by a plurality of tethers.

In the wind power generation system, when the kite 1 rises, the tether is paid out from the winch drum as the kite 1 rises. The drum rotates due to the feeding operation of the tether. Then, the generator rotates with the rotation of the drum, whereby power generation is performed. After the tether has been unwound to a predetermined length or a predetermined time has elapsed, the motor of the winch causes the drum to rotate in a direction that winds up the tether. As a result, the kite 1 is lowered due to the winding operation of the tether. In the wind power generation system, the power generation is performed by repeatedly performing the feeding operation and the winding operation of the tether.

Next, methods of connecting tethers for anchoring the kite 1 will be described referring to FIGS. 2A, 2B, and 3. Here, a method of extending the tether for anchoring the kite 1 by connecting the tether 32 to the tether 31 for anchoring the kite 1 will be described.

Figure 2A:
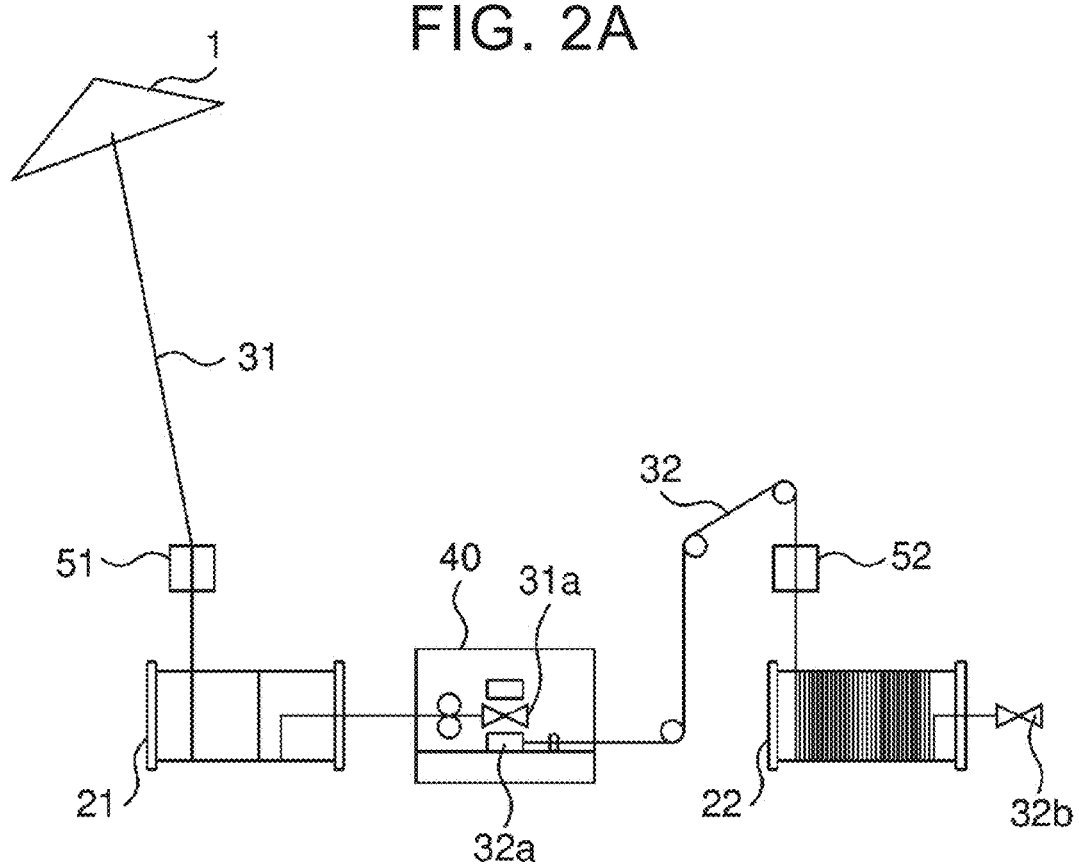
FIG. 2A is a diagram illustrating an example of a method of connecting tethers.

In FIG. 2A, the tether 31 extending from the drum 21 toward the kite 1 may pass through the lead portion 51. One end of the tether 31 is connected to the kite 1. Note that one end portion of the tether 31 may be directly connected to the kite 1, or may be indirectly connected to the kite 1. Here, "indirectly connected" may mean that the kite 1 and one end of the tether 31 are connected via another member (for example, another tether or the like). Note that the lead portion 51 and the lead portion 52 described later may be referred to as a fairlead.

A part of the tether 31 is wound around the drum 21. At this time, the tether 31 may be wound around the drum 21 so that the other end 31a of the tether 31 protrudes from the drum 21. In the situation shown in FIG. 2A, the rotating shaft of the drum 21 may be connected to a generator. The end 31a of the tether 31 is placed in the connecting device 40. When the length of the tether 31 wound around the drum 21 becomes shorter than the predetermined length, the end 31a may be placed in the connecting device 40. In other words, if the length of the tether 31 wound around the drum 21 is greater than the predetermined length, the end 31a may not be placed in the connecting device 40.

The tether 32 has an end 32a and an end 32b. The end 32a of the tether 32 is placed in the connecting device 40. A part of the tether 32 extending from the drum 22 toward the end 32a may pass through the lead portion 52 and the plurality of guide pulleys. In other words, the end 32a drawn from the drums 22 around which the tethers 32 are wound may be placed in the connecting device 40 through the lead portion 52 and the plurality of guide pulleys. As shown in FIG. 2A, the tether 32 may be wrapped around the drum 22 such that an end 32b of the tether 32 (i.e., an end opposite the end 32a connected to the end 31a of the tether 31) protrudes from the drum 22. The drums 21, 22 may constitute a part of the ground equipment 2 shown in FIG. 1. In the situation shown in FIG. 2A, the rotating shaft of the drum 22 may not be connected to the generator.

The connecting device 40 may automatically connect the tether 31 and the tether 32, for example, when the end 31a of the tether 31 and the end 32a of the tether 32 are placed in the connecting device 40. For example, a connecting mechanism may be attached to each of the end 31a of the tether 31 and the end 32a of the tether 32. Here, the connecting device 40 may connect the tether 31 and the tether 32 by fitting a connecting mechanism attached to the end 31a and a connecting mechanism attached to the end 32a. Examples of the connecting mechanisms include mechanical couplings and buckles. In this case, the connected tethers 31, 32 can be separated by releasing the engagement state of the connecting mechanism. For example, no connecting mechanisms may be attached to the end 31a of the tether 31 and the end 32a of the tether 32, respectively. Here, the connecting device 40 may connect the tether 31 and the tether 32 by twisting the vicinity of the end 31a of the tether 31 and the vicinity of the end 32a of the tether 32. In this case, the twisted tethers 31, 32 can be untwisted to separate the connected tethers 31, 32. In this manner, the connecting mechanism 40 may separably connect the tether 31 and the tether 32.

After the tether 31 and the tether 32 are connected, the tethers 31 and 32 may be removed from the connecting device 40 and the guide pulley, for example. Thereafter, the portion of the tether 31 wound around the drum 21 is unwound from the drum 21, whereby the tether 31 may be removed from the lead portion 51 and the drum 21. Consequently, as shown in FIG. 2B, the tether 32 extends from the drum 22 toward the kite 1. In the condition shown in FIG. 2B, the rotating shaft of the drums 22 may be connected to a generator. In FIG. 2B, reference numeral "33" denotes a connection portion between the tether 31 and the tether 32. By connecting the tether 32 to the tether 31, the length of the entire tether anchoring the kite 1 is increased. Thus, the tether 32 may be referred to as an extension tether. A connecting mechanism may be attached to each of the end 32a and 32b of the tether 32. In this case, it can be said that the extension tether has a connecting mechanism at both ends thereof.

A method of connecting the tethers will now be described with reference to the flowchart of FIG. 3. In FIG. 3, the end of one tether (e.g., the end 31a of the tether 31) is S101 to the connecting device 40. Other tether ends (e.g., the end 32a of the tether 32) are S102 to the connecting device 40 in parallel with or in conjunction with S101 process. The connecting device 40 then S103 one tether and another tether.

In S101 process, the end of one tether may be placed in the connecting device 40, for example, by the connecting device 40 pulling the end of one tether into the connecting device 40. Similarly, in the process of S102, the end of another tether may be placed in the connecting device 40, for example, by the connecting device 40 pulling the end of another tether into the connecting device 40. The connecting device 40 may connect two or more tethers to one tether.

The tether 31 and the tether 32 may be the same type of tether. The tether 31 and the tether 32 may be different types of tethers. For example, by connecting the tether 31 and the tether 32, the flight altitude of the kite 1 can be increased. That is, the tether 31 is used at a higher altitude than the tether 32. The higher the altitude, the lower the temperature, the more likely the tether (e.g., the moisture contained in the tether) is to freeze. In view of this, the tether 31 may be a tether that is more freeze-resistant than the tether 32. That is, the tether 31 may be a freeze-resistant tether.

As described above, in the tether-type wind power generation system, in order to generate electric power, the feeding operation and the winding operation of the tether are repeatedly performed. As shown in FIG. 2B, when the tether 32 is connected to the tether 31, the tether 32 is wrapped around the drum 22. In this case, for power generation, the tether 32 is unwound from the drum 22, and the tether 32 is wound onto the drum 22. As a result, at least a portion of the tether 32 may be damaged by friction. In view of this, the tether 32 may be a tether with that is more abrasion-resistant than the tether 31. That is, the tether 32 may be an abrasion-resistant tether.

A process of separating tethers will be described with reference to FIGS. 2A, 2B, and 4. Here, a method for shortening the tether for anchoring the kite 1 by separating the tethers 31, 32 for anchoring the kite 1 will be described.

Figure 2B:
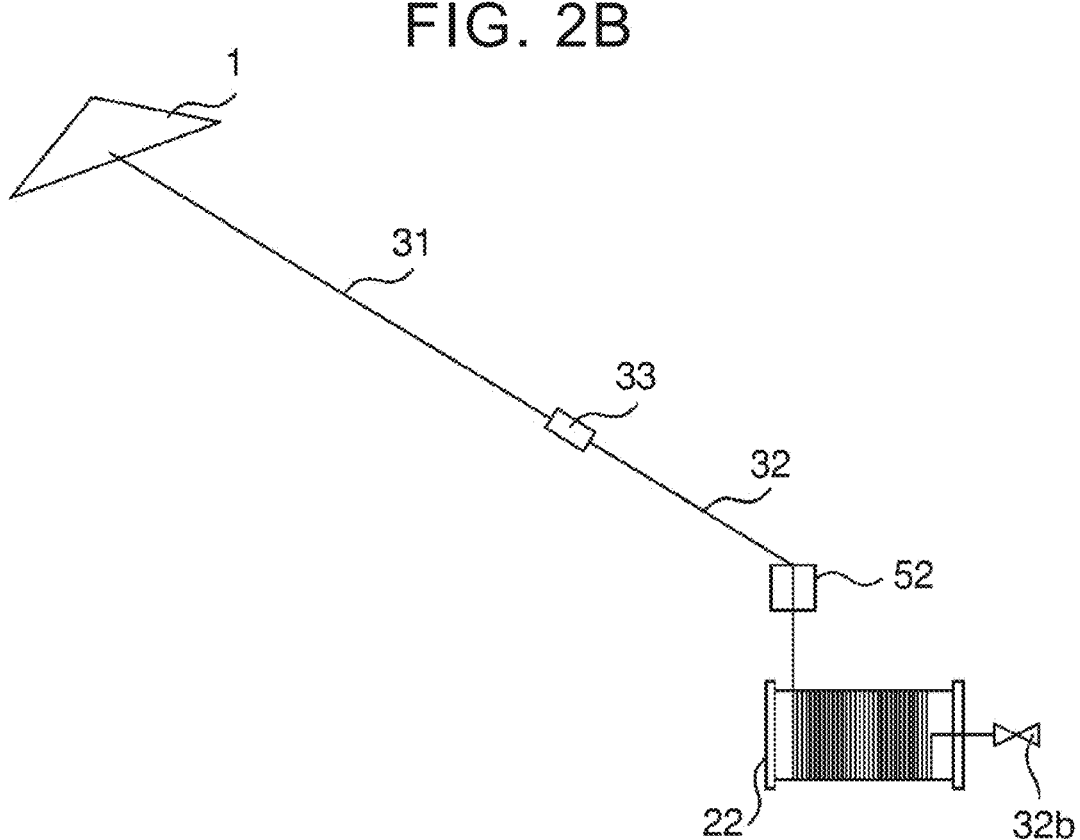
FIG. 2B is a diagram illustrating an example of a method of connecting tethers.
Figure 5:
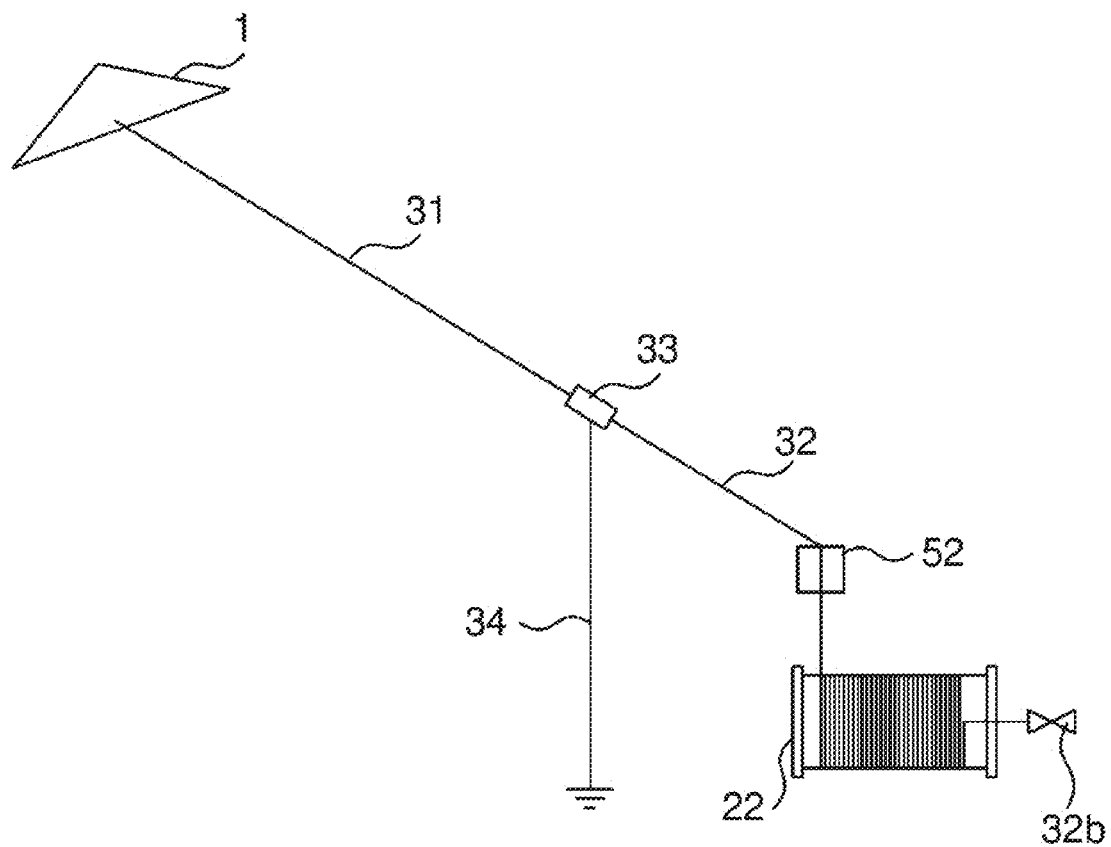
FIG. 5 is a diagram illustrating an example of a connection mode of the tether.

For example, the tether 32 may be wound on the drum 22 until the distance from the drum 22 (in other words, the ground equipment 2) to the connection portion 33 reaches a predetermined distance in the condition shown in FIG. 2B. The tether 31 may then be wrapped around the drum 21. As a result, the tension applied to the tether 31 due to the kite 1 is less likely to be applied to the connection portion 33. Thereafter, the connection portion 33 may be placed in the connecting device 40. If excessive force is not applied to the connection portion 33 and the connecting device 40, the tether 31 may be wound around the drum 21 after the connection portion 33 is placed in the connecting device 40.

The connecting device 40 may separate the end 31a of the tether 31 constituting the connection portion 33 from the end 32a of the tether 32. For example, after the tether 31 and the tether 32 are separated, the axis of rotation of the drum 21 may be connected to a generator. Also, the drum 22 around which the tether 32 is wound may be removed from the ground equipment 2.

A method for separating tethers will now be described with reference to the flowchart of FIG. 4. In FIG. 4, tethers anchoring the kite 1 are S201 onto the drums 22, for example. Thereafter, a tethered connection portion (e.g., connection portion 33) is S202 to the connecting device 40. Before the processing of step 202, a tether (e.g., tether 31) closer to the kite 1 than the connection portion of the tether may be wound around a drum (e.g., drum 21) different from the drum 22. After the process of S202, the connecting device 40 separates one tether from another tether (S203).
Technical Effect The higher the target flight altitude of the kite 1, the longer the length of the tether anchoring the kite 1. If the length of one tether is increased in order to achieve the target flight altitude of the kite 1, the size of the drum around which the tether is wound also increases. On the other hand, in the present embodiment, the tether 32 is connected to the tether 31 that anchors the kite 1, so that the length of the entire tether that anchors the kite 1 is increased. With this configuration, the length of each tether can be significantly shorter than the length for achieving the target flight altitude of the kite 1. Therefore, the size of the drum (for example, at least one of the drums 21 and 22) around which the tether (for example, at least one of the tethers 31 and 32) is wound can be suppressed. Therefore, according to the present embodiment, deterioration of the response of the winch can be suppressed.

In the present embodiment, the number of tethers to be connected is not limited. Therefore, in order to reduce the size of the drum around which the tether is wound, the length of each tether may be shortened. That is, in the present embodiment, the drum may be miniaturized by actively shortening the length of each tether. In this case, the response of the winch can be improved due to the miniaturization of the drum. In addition, due to the miniaturization of the drum, the transportability of the drum (i.e., at least one of the drum on which the tether is wound and the drum on which the tether is not wound) can be improved.

Further, part of the plurality of connected tethers as tethers that anchor the kite 1 may be separated. In addition, instead of a separated tether, a new tether may be connected to the tether anchoring the kite 1. That is, some tethers of the tether anchoring the kite 1 may be replaced. With this configuration, maintenance of the tether for mooring the kite 1 can be performed during flight of the kite 1.

First Modification

A first modification of the tether connection method will be described with reference to FIG. 4. As described above, two or more tethers may be connected to one tether that anchors the kite 1. In the example shown in FIG. 5, the tethers 32 and 34 are connected to the tether 31. In this case, the connection portion 33 may mean a connecting portion between the tether 31, the tether 32, and the tether 34. Here, the tether 34 may be a tether having higher conductivity than the tether 32. The tether 34 may be grounded.

Depending on the weather conditions, lightning may strike the flight kite 1. In this case, if no countermeasure is taken, there is a possibility that a current caused by lightning flows through the ground equipment 2 (see FIG. 1) through the tether that moors the kite 1. On the other hand, in the example shown in FIG. 5, even if lightning strikes the kite 1 in flight, most of the current caused by lightning can be expected to flow to the tether 34. Therefore, according to the first modification, the ground equipment 2 is less likely to be damaged by the current caused by the lightning. In this case, the tether 34 may be referred to as a lightning protection tether.

Second Modification

A second modification of the tether connection method will be described. The kite 1 according to the second modification may be a kite used in a tether-type wind power generation system or may be a kite not used in a tether-type wind power generation system. Here, as a kite that is not used in the tether-type wind power generation system, for example, a kite for photovoltaic power generation that is equipped with a solar panel is exemplified.

In the second modification, the sensor may be disposed at a connection portion between one tether and another tether (for example, the connection portion 33 between the tether 31 and the tether 32 shown in FIG. 2B). Examples of the sensor include at least one of a temperature sensor, a humidity sensor, an altitude sensor, an atmospheric pressure sensor, a wind speed sensor, a wind direction sensor, and a GPS (Global Positioning System) sensor. The sensor disposed at the connection portion may be a radiosonde.

According to the second modification, for example, weather observation can be performed by a sensor disposed at the connection portion between one tether and another tether. In addition, since the kite 1 can stay in the air for a relatively long period of time, it is possible to perform the fixed-point observation of the weather by the sensor.

Aspects of the disclosure derived from the above-described embodiments and modifications are described below.

A method for connecting a tether according to an aspect of the present disclosure includes, while a kite is flying, separably connecting another tether different from one tether to the other end of the one tether whose one end is connected to the kite.

The tether of the aspect may be a freeze-resistant tether, and another tether may be an abrasion-resistant tether. Another tether may be a lightning protection tether. Part of the one tether may be wound around the drum in such a that the other end protrudes from the drum, before the one tether is connection to another tether. A sensor may be disposed at a connection portion between the other end of the one tether and another tether.

The present disclosure is not limited to the above-described embodiments, and can be modified as appropriate within the scope and spirit of the disclosure that can be read from the claims and the entire specification, and a method of connecting a tether with such a modification is also included in the technical scope of the present disclosure.

What is claimed is:

1. A method for connecting a second tether to a kite, the method comprising:

connecting a first tether to the kite, the tether having a first end and a second end, the first end connected to the kite, while the kite is flying, separably connecting the second tether different from the first tether to the second end of the first tether.

2. The method according to claim 1, wherein:

the first tether is a freeze-resistant tether; and the second tether is an abrasion-resistant tether.

3. The method according to claim 1, wherein the second tether is a lightning protection tether.

4. The method according to claim 1, wherein before the second tether is connected to the second end of the first tether, part of the first tether is wound around a drum in such a manner that the second end of the first tether protrudes from the drum.

5. The method according to claim 1, wherein a sensor is disposed at a connection portion between the second end of the first tether and the second tether.

* * * * *